(12) United States Patent
Verbrugge et al.

(10) Patent No.: US 8,253,261 B2
(45) Date of Patent: Aug. 28, 2012

(54) SYSTEM AND METHOD FOR GENERATING POWER FROM A FAN

(75) Inventors: David J. Verbrugge, Milford, MI (US); Mark De Backer, Armada, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 498 days.

(21) Appl. No.: 12/412,082

(22) Filed: Mar. 26, 2009

(65) Prior Publication Data

US 2010/0244445 A1 Sep. 30, 2010

(51) Int. Cl.
*F03D 9/00* (2006.01)
(52) U.S. Cl. .................. 290/44; 290/1 R; 290/2
(58) Field of Classification Search .................. 290/1 A, 290/1 R, 2, 44, 55; 322/1; 415/121.3; 180/2.2, 180/2.1, 165, 65.3
See application file for complete search history.

(56) References Cited

U.S. PATENT DOCUMENTS

| | | | | |
|---|---|---|---|---|
| 5,746,283 A | * | 5/1998 | Brighton | 180/65.31 |
| 8,013,458 B2 | * | 9/2011 | Eisenhour | 290/2 |
| 2002/0163198 A1 | * | 11/2002 | Gee | 290/40 C |
| 2003/0057708 A1 | * | 3/2003 | Wu | 290/55 |
| 2005/0280664 A1 | * | 12/2005 | DePaoli | 347/5 |
| 2007/0126238 A1 | * | 6/2007 | Augusto | 290/52 |
| 2007/0262584 A1 | * | 11/2007 | Lu | 290/55 |
| 2010/0237627 A1 | * | 9/2010 | Socolove et al. | 290/55 |

FOREIGN PATENT DOCUMENTS

FR 2785738 A1 5/2000

OTHER PUBLICATIONS

German Office Action, dated Feb. 29, 2012, for German Patent Application No. 10 2010 010 026.9.

* cited by examiner

*Primary Examiner* — Tho D Ta

(57) ABSTRACT

A system for generating power for a vehicle is provided. The system comprises a fan positioned to receive a flow of air, a turbine coupled to the fan, the turbine adapted to rotate the fan when operating in a first mode and to receive power from the fan when operating in a second mode, the turbine adapted to generate electrical power from the power received from the fan, and an electronic control unit adapted to selectively engage the first and second modes of the turbine.

18 Claims, 4 Drawing Sheets

SYSTEM AND METHOD FOR GENERATING POWER FROM A FAN

TECHNICAL FIELD

Embodiments of the subject matter described herein relate generally to cooling systems in vehicles. More particularly, embodiments of the subject matter relate to generating power from a cooling fan of a vehicle.

BACKGROUND

Improving the fuel efficiency of a vehicle is a widely-desired goal in the automobile industry. In addition to the immediate effects of reduced cost of operation, vehicles which require less fuel impose a smaller burden on any resources on which they rely for power. Accordingly, improvements to vehicles which reduce the fuel required for operation have immediate application.

One source of fuel expenditure in vehicles is power for operating one or more cooling fans. Cooling fans are used to draw air across a radiator or other heat exchanger used to moderate the internal temperature of the vehicle's engine. Turning the cooling fans requires power, which is typically obtained from the same power source that provides power for propulsion of the vehicle. Thus, cooling fans often impose a power cost on vehicles. When not in use, they are usually idle to reduce their power cost.

BRIEF SUMMARY

A system for generating power for a vehicle is provided. The system comprises a fan positioned to receive a flow of air, a turbine coupled to the fan, the turbine adapted to rotate the fan when operating in a first mode and to receive power from the fan when operating in a second mode, the turbine adapted to generate electrical power from the power received from the fan, and an electronic control unit adapted to selectively engage the first and second modes of the turbine.

A method of generating power for a vehicle is also provided. The vehicle comprises a fan, a power relay, and a heat exchanger. The method comprises detecting that the heat exchanger has a temperature below a first predetermined temperature, engaging a turbine to the fan, the fan positioned to receive a flow of air, generating electrical power with the turbine from a rotation of the fan, and providing the electrical power to the power relay.

Another method of generating power for a vehicle is provided. The method comprises a cooling fan, a heat exchanger, and a power relay. The method comprises engaging a turbine to the cooling fan, the cooling fan positioned to receive a flow of air from outside the vehicle, generating electrical power with the turbine from a rotation of the cooling fan, and providing the electrical power to the power relay.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components and with reference operations, processing tasks, and functions that may be performed by various computing components or devices. It should be appreciated that the various block components shown in the figures may be realized by any number of hardware, software, and/or firmware components configured to perform the specified functions. For example, an embodiment of a system or a component such as a display device or electronic control system may employ various integrated circuit components, e.g., memory elements, digital signal processing elements, logic elements, look-up tables, or the like, which may carry out a variety of functions under the control of one or more microprocessors or other control devices.

Figure 1:
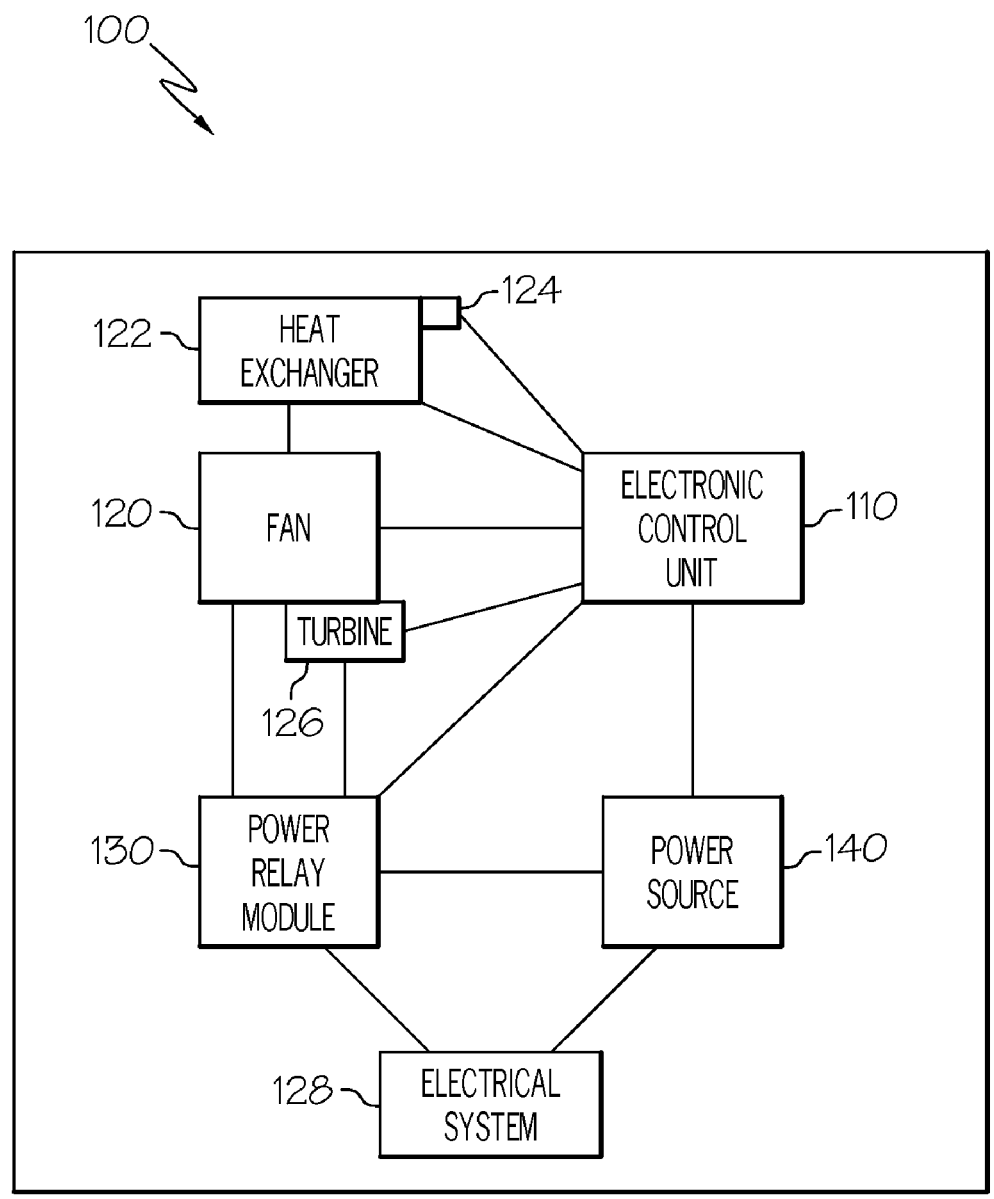
FIG. 1 is a schematic of an embodiment of a vehicle having a electrical power generation system.

"Coupled"—The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the schematic shown in FIG. 1 depicts one exemplary arrangement of elements, additional intervening elements, devices, features, or components may be present in an embodiment of the depicted subject matter.

"Adjust"—Some elements, components, and/or features are described as being adjustable or adjusted. As used herein, unless expressly stated otherwise, "adjust" means to position, modify, alter, or dispose an element or component or portion thereof as suitable to the circumstance and embodiment. In certain cases, the element or component, or portion thereof, can remain in an unchanged position, state, and/or condition as a result of adjustment, if appropriate or desirable for the embodiment under the circumstances. In some cases, the element or component can be altered, changed, or modified to a new position, state, and/or condition as a result of adjustment, if appropriate or desired.

In addition, certain terminology may also be used in the following description for the purpose of reference only, and thus are not intended to be limiting. For example, terms such as "upper", "lower", "above", and "below" refer to directions in the drawings to which reference is made. Such terminology may include the words specifically mentioned above, derivatives thereof, and words of similar import. Similarly, the terms "first", "second" and other such numerical terms referring to structures do not imply a sequence or order unless clearly indicated by the context.

One technique, which is described in more detail below, for operating idle cooling fans can be to receive airflow from outside the vehicle with the cooling fan. Because of the aerodynamic shape of the fan, when an airstream is passed over it, the fan will rotate. When coupled to a turbine, the rotation of the fan can be used to generate electrical power. This electrical power can be used to provide a motive force for the vehicle, to power a load imposed on the electrical system of the vehicle by components of the vehicle, or the electrical power can be stored for future use.

FIG. 1 illustrates an embodiment of a vehicle 100 comprising an electronic control unit (ECU) 110, a fan 120, a heat exchanger 122, a temperature sensor 124, a turbine 126, an electrical system 128, a power relay module 130, and a power source 140. The ECU 110 can be operably coupled to the fan 120, to the heat exchanger 122, to the temperature sensor 124, to the turbine 126, to the electrical system 128, to the power relay module 130, and to the power source 140. The fan 120 can be operably coupled to the heat exchanger 122, to the turbine 126, and to the power relay module 130. The power relay module 130 can be coupled to the turbine 126, to the electrical system 128, and to the power source 140. Any suitable vehicle that has similar components and uses a similar process incorporating fans can be used, including but not limited to hybrid-, electrical-, and gasoline-powered automobiles, watercraft, or motorcycles.

The ECU 110 can be implemented or performed with one or more processing components, such as a general purpose processor, a content addressable memory, a digital signal processor, an application specific integrated circuit, a field programmable gate array, any suitable programmable logic device, discrete gate or transistor logic, discrete hardware components, or any combination designed to perform the functions described herein. A processor may be realized as a microprocessor, a controller, a microcontroller, or a state machine. Moreover, a processor may be implemented as a combination of computing devices, e.g., a combination of a digital signal processor and a microprocessor, a plurality of microprocessors, one or more microprocessors in conjunction with a digital signal processor core, or any other such configuration.

The ECU 110 preferably operates various components and features of the vehicle 100, including the fan 120, turbine 126, and power relay module 130. The ECU 110 can also receive information from a variety of sensors distributed throughout the vehicle 100, including the temperature sensor 124. The ECU 110 can perform operations in response to the various sensors, including establishing different states of operation, operatively commanding components to perform tasks, and adjusting operation of components in response to information detected by the sensors. One feature of the ECU 110 can be to selectively engage different operating modes of the fan 120, turbine 126, power relay module 130, and other components, as described below.

As one example of operational control exerted by the ECU 110, the ECU 110 can, either independently or together with the power relay module 130, monitor the heat exchanger 122 through the use of the temperature sensor 124 to determine the temperature of the heat exchanger 122. Once this temperature has been determined, the ECU 110 and/or the power relay module 130 can compare the temperature to a set of predetermined temperatures to determine a desired operational mode of the fan 120, as described in greater detail below. One example of a desired operational mode can be operating the turbine 126 to use the fan 120 to generate and store power in the power source 140, as will be described in methods 400 and 500.

The ECU 110 can be coupled to the power source 140, and can determine the power level of the power source 140. The ECU 110 can also operate features of the power source 140 to use the stored power. As one example, the stored power can be used to propel the vehicle 100, or to provide power for other systems while the vehicle 100 is in operation, including the electrical system 128. It should be understood that the ECU 110 can perform a plurality of operations, some as described above and others not listed in this description.

The fan 120 can be of any type suited to the vehicle 100, heat exchanger 122, turbine 126, power relay module 130, and ECU 110. It can be powered electrically-powered, solar powered, or by any other means appropriate to its operation. The fan 120 can be made of any of a variety of materials appropriate to the proper operation of the vehicle 100, and can be of any type sufficient to its function, including variations of size, blade shape and design, and so forth. In the present embodiment, the fan 120 is a cooling fan, whereas in other embodiments, the fan 120 can have other purposes and uses within the vehicle. More than one fan 120 can be used in the vehicle 100, in any configuration as desired or necessary. When described herein, the fan 120 should be understood to include various features in addition to the fan blade(s). For example, an axis supporting the fan blades, as well as a bearing assembly supporting the axis are collectively referred to as the fan 120. In certain embodiments, the turbine 126 can be included as an integral portion of the fan 120, whereas in other embodiments, the turbine 126 can be a separate component.

In one operational mode or state, the fan 120 can draw air across the heat exchanger 122 to aid in the process of cooling the engine of vehicle 100. In another operational state, the air flow from fan 120 can be used to turn the turbine 126 or another generator to generate power. The turbine 126 can be integral with the fan 120, or can be a separate component, as described in greater detail below. In one embodiment, an electric fan can be used because it can serve both as a fan 120 in the cooling operational state, and can serve as the coupled turbine 126 for purposes of generating power. It should be understood that an electric fan is only one embodiment of fan 120, and any of a number of types of fans can be used.

The heat exchanger 122 is coupled with the fan 120, the temperature sensor 124, and the ECU 110 to draw air from the fan 120. The heat exchanger 122 can be used to cool various internal features of the vehicle 100. For example, the heat exchanger 122 can received heated coolant exiting from an internal combustion engine or from batteries. The heated coolant should be cooled prior to recirculation back to the hot portions of the vehicle 100. The heat exchanger 122 can be used to transfer heat from the heated coolant to the surrounding environment prior to recirculation. Accordingly, the heat exchanger 122 can have variety of surface features, including fins and folds, which aid the exchange of heat from the heated coolant to the surrounding environment. The heat exchanger 122 can be a radiator of a vehicle, and the use of such is well-known. The heat exchanger 122 can be of any type suited to the vehicle 100, including cooperative operation with the fan 120 and ECU 110.

The temperature sensor 124 is preferably coupled to the heat exchanger 122. The temperature sensor 124 can be any appropriate type of sensor for a particular embodiment. Some embodiments of temperature sensors 124 can include thermocouples, thermistors, and so on. Preferably, the temperature sensor 124 can determine the temperature of the heat exchanger 122, at a desired position. For example, the temperature of the heated coolant within the heat exchanger 122 can be sensed. In some embodiments, the heated coolant can be sensed when entering the heat exchanger 122, when leaving it, at an intermediary point, or any combination thereof. The temperature sensor 124 preferably is configured to provide information regarding the sensed temperature to the ECU 110. The temperature sensor 124 can perform internal operations to determine a value for a temperature (or temperatures) to provide to the ECU 110, or it can provide a voltages or voltages, from which the ECU 110 can itself perform operations to determine the temperature of the heat exchanger 122.

The turbine 126 is preferably coupled to the fan 120 and to the ECU 110. The turbine 126 can be an electrical turbine, and adapted to perform the described functions, and have the described features. Preferably, the turbine 126 is capable of producing electrical power from mechanical work. In certain embodiments, the turbine 126 is reversible, and can produce mechanical work, such as turning the fan 120, from electrical power. The turbine 126 can provide electrical power to and receive electrical power from the power relay module 130, as described in greater detail below. The turbine 126 can be integrally formed in the fan 120, or can be a separate component. The turbine 126 is preferably controlled by the ECU 110, although in certain embodiments, the turbine 126 can be coupled to sensors allowing it to perform independent operations.

The electrical system 128 of the vehicle 100 comprises a variety of devices and components which operate based on electricity. These devices and components can include such features of the vehicle 100 as a radio, electrically-powered windows and door locks, headlights of the vehicle 100, dashboard display devices, and so on. The electrical system 128 can operate at a certain load, drawing power from the power source 140.

The power relay module 130 can be coupled to the fan 120, to the turbine 126, to the electrical system 128, and to the power source 140. The power relay module 130 can perform a variety of power transfer operations. For example, the power relay module 130 can provide power from the power source 140 to the fan 120, causing the fan 120 to rotate to draw air across the heat exchanger 122, in a first mode. The power relay module 130 can also receive power from the turbine 126, and can modulate, regulate, convert, or otherwise adjust the power, thereafter providing it to the electrical system 128, or to the power source 140. The power relay module 130 can, coupled with the ECU 110, determine how to utilize the stored power resulting from methods 400 and 500, as later described.

The power source 140 can be of any type suited to the vehicle, power relay module, and control unit. As an example, the power source 140 can be a battery, such as a lithium-ion battery, an alkaline battery, a wet or dry cell type of battery, fuel cells, or any other source of power appropriate to the proper operation of the vehicle 100. Among other functions, the power source 140 can provide power the fan 120, including via the turbine 126, and to the electrical system 128 and, in some embodiments, provide information or a signal to the ECU 110 indicating it current power level. Accordingly, the power source 140 can be of any type appropriate or desired for the embodiment, such as adapted to store or transfer power as determined by the ECU 110.

Figure 2:
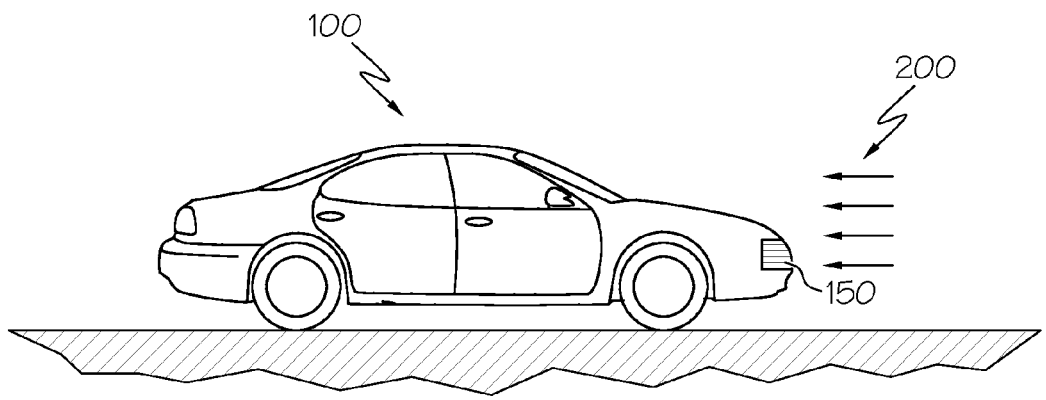
FIG. 2 is a diagram of a vehicle in a stationary position.

FIG. 2 depicts an embodiment of the vehicle 100 including a surrounding environment, consisting of a cooling grill 150 and wind 200. In this embodiment, vehicle 100 is stationary. As wind 200 flows toward the vehicle 100, it can enter the vehicle 100 via the cooling grill 150. The cooling grill 150 can be an opening or vent used to receive or release air from outside or inside of the vehicle 100. This cooling grill 150 can be made of any of a variety of materials appropriate to the proper operation of the vehicle 100, and preferably inhibits the entry of large objects, while still allowing air to flow into the vehicle, and over the heat exchanger 122. Accordingly, the heat exchanger 122 is preferably positioned near the cooling grill 150, with the fan 120 behind the heat exchanger 122. The cooling grill 150 can also be of any desired shape or size appropriate to the vehicle 100 and its functions. In some embodiments, the cooling grill 150 can be manipulated to close, similar to a shutter. In this embodiment, the cooling grill 150 is used to capture outside air flow. In FIG. 2, this outside air flow is wind 200. It should be understood that any combination of wind, passing air, artificially generated or directed air flow, or natural air flow can be used to provide the air flow used in this process.

As one example, wind 200 can be accepted into the vehicle 100 via cooling grill 150 so that it can be used to cool the radiator and other components of vehicle 100. Additionally, the wind 200 can travel past the heat exchanger 122 and impinge on the fan 120. The wind 200 can rotate the fan 120 by passing over the fan blades. As described in greater detail below, rotation of the fan 120 can provide mechanical work to the turbine 126. The turbine 126, in turn, can convert the mechanical work to electrical power. Thus, the vehicle 100 can generate electrical power from the passing wind 200. The intake of air flow by the cooling grill 150 can be affected by the speed of the wind, the temperature of the surrounding environment, humidity, air pressure, or any other factor or combination of factors.

Figure 3:
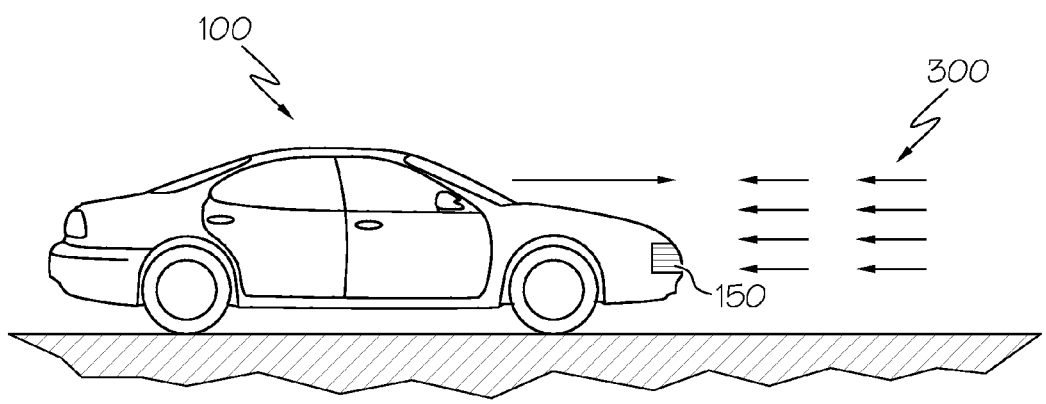
FIG. 3 is a diagram of a moving vehicle.

FIG. 3 depicts an embodiment of the vehicle 100 in a surrounding environment, wherein the vehicle 100 includes the cooling grill 150 and passing air 300. In this embodiment, vehicle 100 is traveling, and the passing air 300 represents the flow of air around the vehicle 100. The speed at which vehicle 100 is traveling is variable, and is dependent on any number of factors relating to the operation of the vehicle 100 and any other factors. As the vehicle 100 travels, passing air 300 flows toward the vehicle 100, and its air flow can be pass through the cooling grill 150.

The passing air 300 accepted into the vehicle 100 via cooling grill 150 can be used to cool the radiator and other components of vehicle 100. Alternatively, the passing air 300 can be used to turn the fan 120, and in turn the turbine 126, thereby generating electrical power, in a manner similar to that described above, with respect to the stationary embodiment of the vehicle 100.

Figure 4:
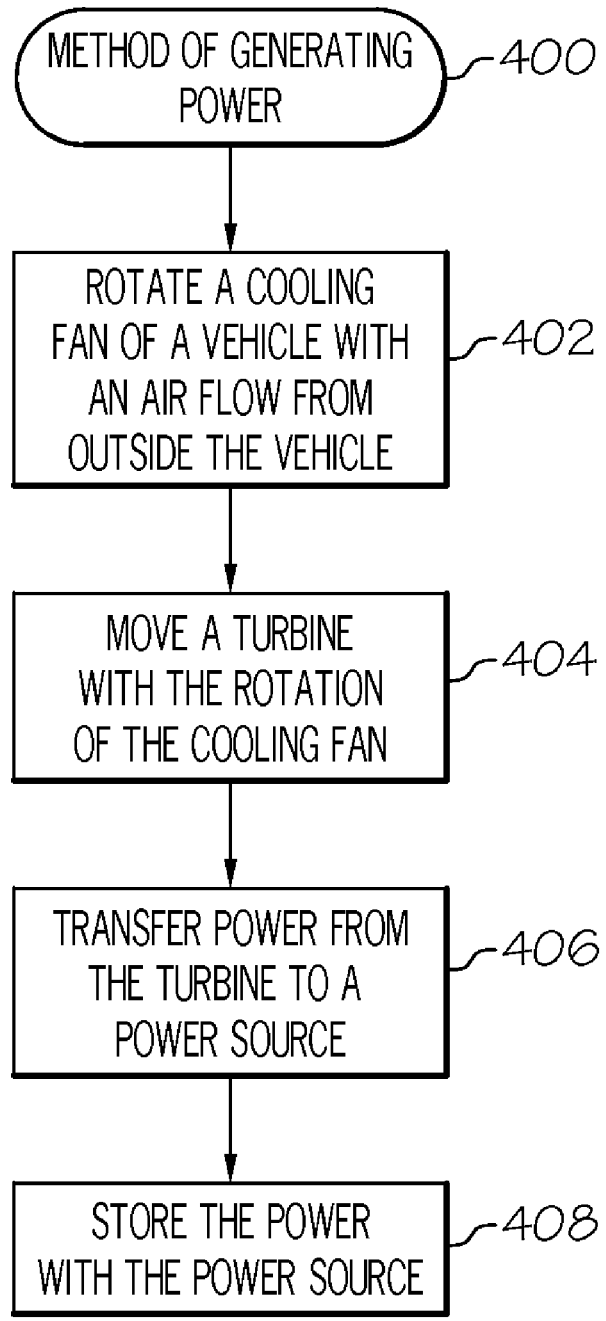
FIG. 4 is a flowchart illustrating a method of generating electrical power with a fan of a vehicle.

FIG. 4 illustrates a method 400 of generating power using a fan 120 of a vehicle 100. For illustrative purposes, the following description of method 400 may refer to elements mentioned above in connection with FIGS. 1-3. In practice, portions of method 400 may be performed by different elements of the described system, e.g., ECU 110, power relay module 130, or heat exchanger 122. It should be appreciated that method 400 may include any number of additional or alternative tasks, the tasks shown in FIG. 4 need not be performed in the illustrated order, and method 400 may be incorporated into a more comprehensive procedure or process having additional functionality not described in detail herein.

To generate power using a cooling fan, such as the fan 120, while the vehicle 100 is stationary, the fan 120 in the vehicle 100 is rotated using an air flow from outside the vehicle (task 402) as illustrated in FIG. 2. As one example, the air flow impinging on the fan 120 can be the wind 200. The ECU 110 and the power relay module 130 can rely on signals from sensors in the vehicle 100 for information regarding the operating conditions of the vehicle 100. From these signals, the ECU 110 and/or the power relay module 130 can determine that the vehicle 100 is in a stationary position and that the fan 120 is being rotated by the wind 200. Once it has been determined that the vehicle 100 is in a stationary position and that the fan 120 is being rotated, the turbine 126 can be engaged and moved (task 404).

In alternative embodiments, the turbine 126 can be engaged to the fan 120 to receive work for power generation any time the vehicle is stationary. In certain embodiments, the ECU 110 can perform additional steps to determine that the ignition is off prior to engaging the turbine 126. In some embodiments, the ECU 110 can operate the fan 120 to cool the heat exchanger 122 after the ignition is off and the vehicle 100 is stationary until the temperature of the heat exchanger 122 falls below a predetermined temperature. Regardless of the embodiment, the ECU 110 can determine a set of conditions during which the fan 120 is not used to draw air across the heat exchanger 122, the vehicle 100 is stationary, and the fan 120 is being rotated by wind 200. The turbine 126 can then be engaged with the fan 120, as described.

Rotation of the fan 120 causes the engaged turbine 126 to generate electrical power. This power can then be transferred from the turbine to power source 140 (task 406). In one embodiment, the power can be transferred through the use of the power relay module 130. The power relay module 130 can function as a power regulator or transformer, as appropriate. One embodiment of the power regulator could be to regulate the amount of power transferred to or stored by the power source, and to work with the components of the system to transfer this power to the power source 140. In other embodiments, the power relay module 130 to provide power to additional or alternative components, such as the electrical system 128.

Once power is received by the power source 140, this power can be stored by power source 140 for later use (task 408). As an example, the stored power could be used to charge the vehicle 100's battery or to supplement other power systems while the vehicle 100 is in operation. It should be understood that any number of other possible uses for this power can be realized as desired for the embodiment.

Figure 5:
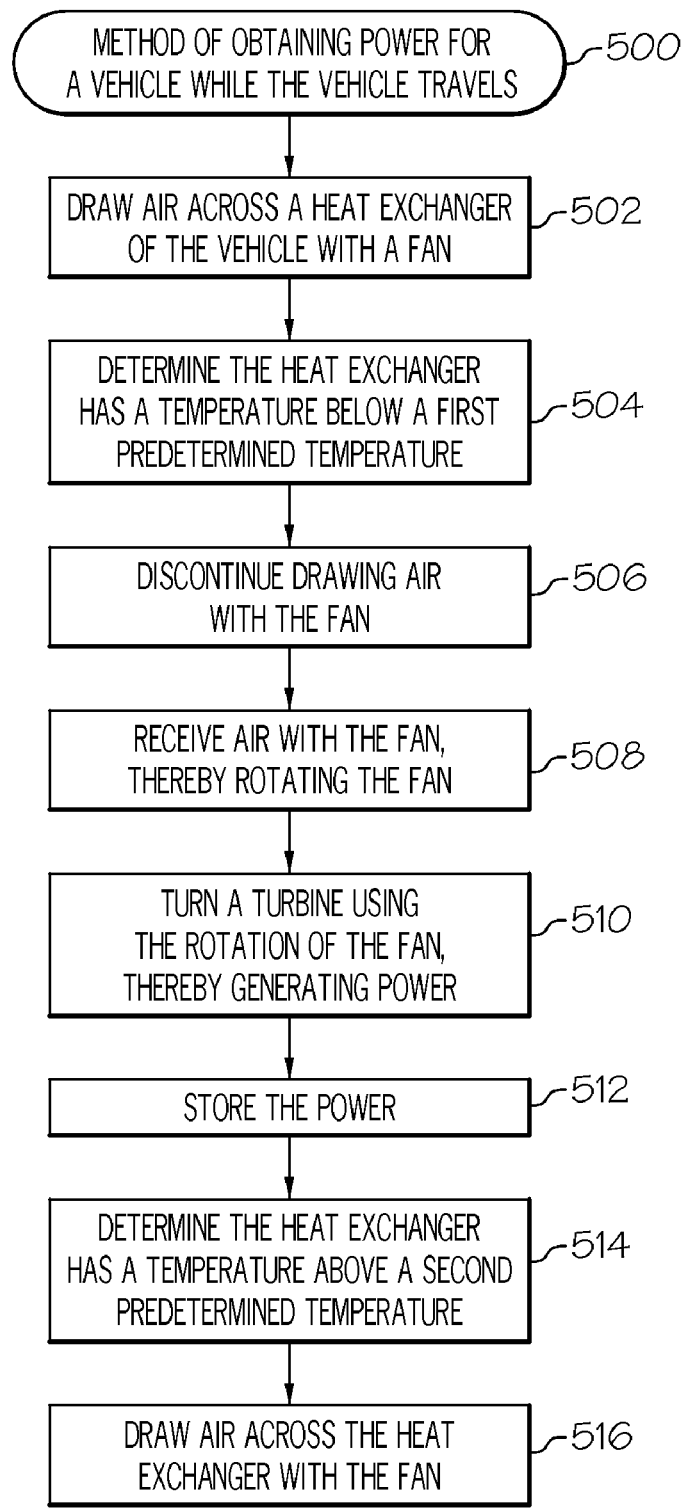
FIG. 5 is a flowchart illustrating another method of generating electrical power with a fan of a vehicle.

FIG. 5 illustrates a method 500 of obtaining power for the vehicle 100 while traveling. To generate power while the vehicle 100 travels, air passing across the heat exchanger 122 turns the fan 120, which generates power using the turbine 126. Initially, the fan 120 can be used to draw air across the heat exchanger 122 (task 502). As one example, the drawn air flow can be passing air 300. The air drawn across the heat exchanger 122 can reduce the temperature of heated coolant therein.

The ECU 110 and the power relay module 130 can rely on signals from sensors in the vehicle 100 for information regarding the operating conditions of the vehicle 100, including the temperature sensor 124. From these signals, the ECU 110 and/or the power relay module 130 can determine that the heat exchanger 122 has a temperature below a first predetermined temperature (task 504). It should be understood that the first predetermined temperature is variable and can be configured differently for each embodiment of the vehicle 100. Preferably, the first predetermined temperature indicates a temperature beneath which it is possible to cool the heat exchanger 122 solely through passive means, such as normal air flow, and without the need for operation of the fan 120 to draw air across the heat exchanger 122. Once it has been determined that the heat exchanger 122 has a temperature below this first predetermined temperature, the heat exchanger can discontinue drawing air from the fan (task 506).

The fan 120, because it is positioned to receive air from the cooling grill 150, continues to receive air from outside the vehicle 100, thereby rotating the fan 120 (task 508). The rotation of the fan 120 can be used to turn the turbine 126, such as by engaging the turbine 126 to the fan 120, and power can be generated as the turbine 126 is turned (task 510). This power can then be transferred from the turbine 126 to power source 140, whereupon it is stored (task 512). In other embodiments, the power relay module 130 can provide the generated power to the electrical system 128 where it can be used to reduce the load imposed on other power generating or storing components by electrically-powered features of the vehicle 100. In some embodiments, the power can be provided to a propulsion system for use in aiding the travel of the vehicle. Preferably, the power is transferred through the power relay module 130. Thus, it should be understood that any number of other possible uses for this power can be realized as desired for the embodiment.

In addition, the ECU 110 and/or the power relay module 130 can continuously monitor the different sensors distributed throughout the vehicle 100, including the temperature sensor 124. Thus, under certain circumstances, the ECU 110 and/or the power relay module 130 can receive information indicating that the heat exchanger 122 has a temperature above a second predetermined temperature (task 514). It should be understood that the second predetermined temperature is individually definable and configurable for different embodiments. Once the ECU 110 has been determined that the heat exchanger 122 has a temperature above the second predetermined temperature, the turbine 126 can be disengaged from the fan (task 516). In certain embodiments where the fan 120 and turbine 126 are integrally formed, the turbine 126 can still be coupled to the fan 120, but can be operated by the ECU 110 to rotate the fan 120, rather than to receive mechanical work from it. Thus, after the temperature of the heat exchanger 122 rises above the second predetermined temperature, the ECU 110 can operate the fan 120 and the turbine 126 to return to the first mode of operation, namely drawing air across the heat exchanger 122 (task 516).

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A system for generating power for a vehicle, the system comprising:
 a fan positioned to receive a flow of air from outside the vehicle;
 a turbine coupled to the fan, the turbine having a first mode of operation and a second mode of operation; and
 an electronic control unit (ECU) coupled to the fan and the turbine;

wherein, when the ECU engages the first mode of operation, the turbine rotates that fan to draw the flow of air from outside the vehicle to cool the system;

wherein, when the ECU engages the second mode of operation, the fan is rotated by the flow of air from outside the vehicle, thereby rotating the turbine to generate electrical power.

2. The system of claim 1, further comprising a sensor coupled to the ECU, and wherein the ECU is further adapted to engage the first mode of the turbine in response to a first signal from the sensor, and to engage the second mode of the turbine in response to a second signal from the sensor.

3. The system of claim 2, wherein the vehicle comprises a heat exchange, and the sensor comprises a temperature sensor coupled to the heat exchanger.

4. The system of claim 3, wherein the ECU is further adapted to engage the first mode of the turbine in response to the first signal from the temperature sensor indicating a temperature above a first predetermined temperature.

5. The system of claim 4, wherein the ECU is further adapted to engage the second mode of the turbine in response to the second signal from the temperature sensor indicating a temperature below a second predetermined temperature.

6. The system of claim 5, wherein the first predetermined temperature is lower than the second predetermined temperature.

7. The system of claim 1, further comprising a power relay module and a power source, the power relay module adapted to transfer electrical power from the power source to the turbine in the first mode and to transfer electrical power from the turbine to the power source in the second mode.

8. The system of claim 7, wherein the vehicle comprises an electrical system, and the ECU is further adapted to operate the power relay module to provide power to the electrical system.

9. A method of generating power for a vehicle comprising a fan, a power relay, and a heat exchanger, the method comprising:

detecting that the heat exchanger has a temperature below a first predetermined temperature;

engaging a turbine to the fan, the fan positioned to receive a flow of air;

generating electrical power with the turbine from a rotation of the fan; and providing the electrical power to the power relay;

detecting that the heat exchanger has a temperature above a second predetermined temperature; and disengaging the turbine from the fan in response to detecting that the heat exchanger has a temperature above the second predetermined temperature.

10. The method of claim 9, further comprising operating the turbine to rotate the fan in response to detecting the heat exchanger has a temperature above the second predetermined temperature.

11. The method of claim 9, wherein the vehicle further comprises a power storage device, and the method further comprises:

providing the electrical power to the power storage device; and storing the electrical power with the power storage device.

12. The method of claim 9, wherein generating electrical power with the turbine from the rotation of the fan comprises rotating the fan with air passing outside the vehicle.

13. The method of claim 9, wherein the vehicle further comprises an electrical system, and the method further comprises providing the electrical power to the electrical system with the power relay.

14. The method of claim 13, further comprising powering movement of the vehicle with the electrical power.

15. A method of generating power for a vehicle comprising a cooling fan, a heat exchanger, and a power relay, the method comprising:

engaging, in a first mode, a turbine to the cooling fan, the cooling fan positioned to receive a flow of air from outside the vehicle;

generating electrical power with the turbine from a rotation of the cooling fan;

providing the electrical power to the power relay; and operating, in a second mode, the turbine to rotate the cooling fan to draw air across the heat exchanger.

16. The method of claim 15, further comprising:

supplying the electrical power to a power storage device; and storing the electrical power with the power storage device.

17. The method of claim 15, wherein the vehicle further comprises an electrical system, and the method further comprises supplying the electrical power to the electrical system.

18. The method of claim 15, wherein the vehicle further comprises a second cooling fan, and the method further comprises:

engaging a second turbine to the second cooling fan; and generating electrical power with the second turbine from the rotation of the second cooling fan.

* * * * *